(No Model.) 2 Sheets—Sheet 1.

F. G. RITCHIE.
INSTRUMENT FOR USE BY OCULISTS AND OPTICIANS.

No. 562,424. Patented June 23, 1896.

WITNESSES:
William Goebel
F. S. Kennedy

INVENTOR
Frederic G. Ritchie
BY George Cook
ATTORNEY (No Model.) 2 Sheets—Sheet 2.
F. G. RITCHIE.
INSTRUMENT FOR USE BY OCULISTS AND OPTICIANS.
No. 562,424. Patented June 23, 1896.
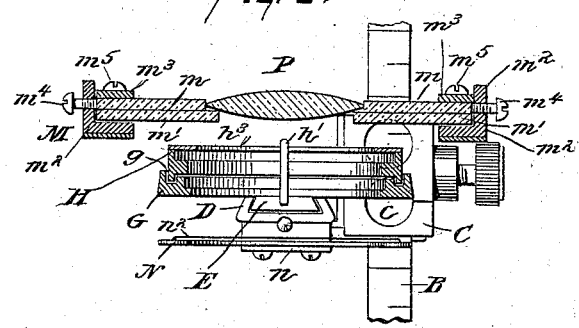
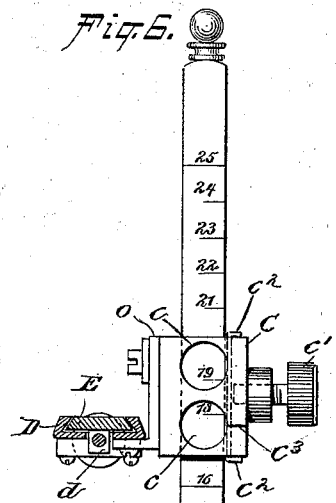
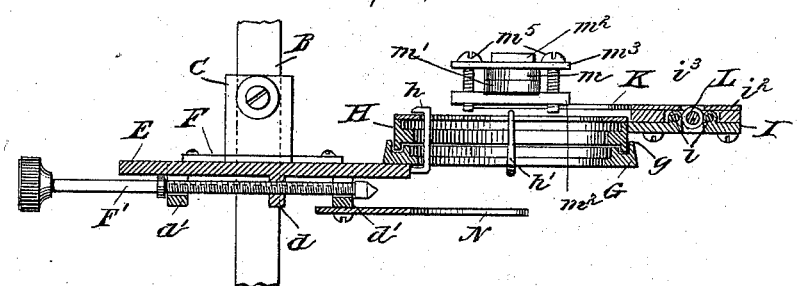
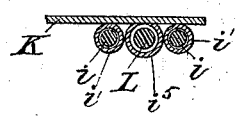
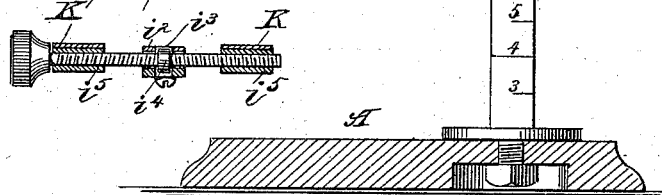
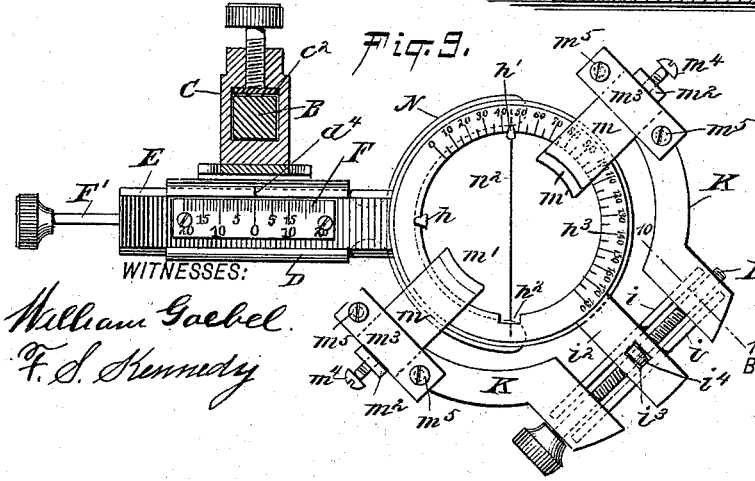
WITNESSES:
William Gaebel
F. S. Kennedy
INVENTOR
Frederic G. Ritchie
BY George Cook
ATTORNEY.

UNITED STATES PATENT OFFICE.

FREDERIC GILBERT RITCHIE, OF NEW YORK, N. Y.

INSTRUMENT FOR USE BY OCULISTS AND OPTICIANS.

SPECIFICATION forming part of Letters Patent No. 562,424, dated June 23, 1896.

Application filed April 12, 1895. Serial No. 545,443. (No model.)

*To all whom it may concern:*

Be it known that I, FREDERIC GILBERT RITCHIE, a citizen of the United States, and a resident of New York, in the county of New York and State of New York, have invented certain new and useful Improvements in Instruments for Use by Oculists and Opticians, of which the following is a specification.

My invention relates to an improvement in devices for use by oculists and opticians, and more particularly to an instrument which I have termed a "prismo-axometer," the object of my invention being to provide an instrument simple in character, and by means of which the operator can easily and readily determine ($a$) the axis of a cylindrical lens, ($b$) the prismatic effect of a decentrated lens, ($c$) the angle of deviation of a prism, and ($d$) the amount of decentration of a lens necessary to obtain a given prismatic effect.

With these and other ends in view my invention consists in certain novel features of construction and combinations of parts, as will be hereinafter fully described, and pointed out in the claims.

Figure 1:
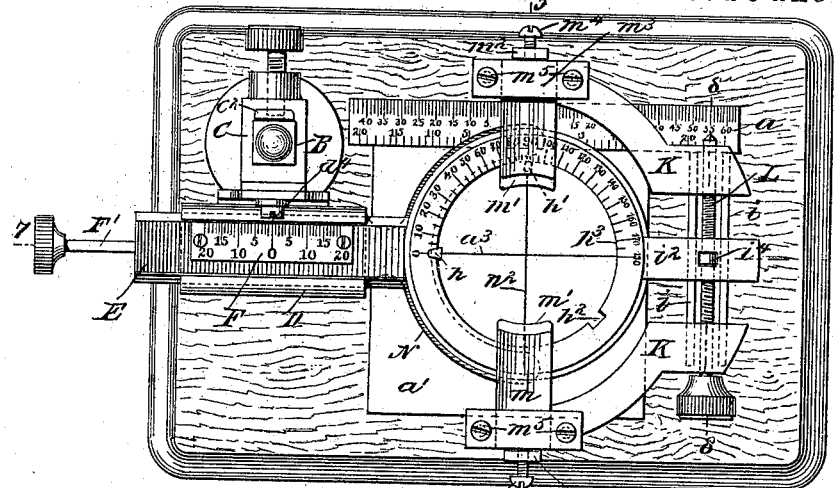
Figure 4:
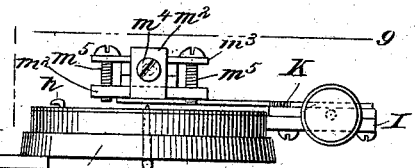
Figure 2:
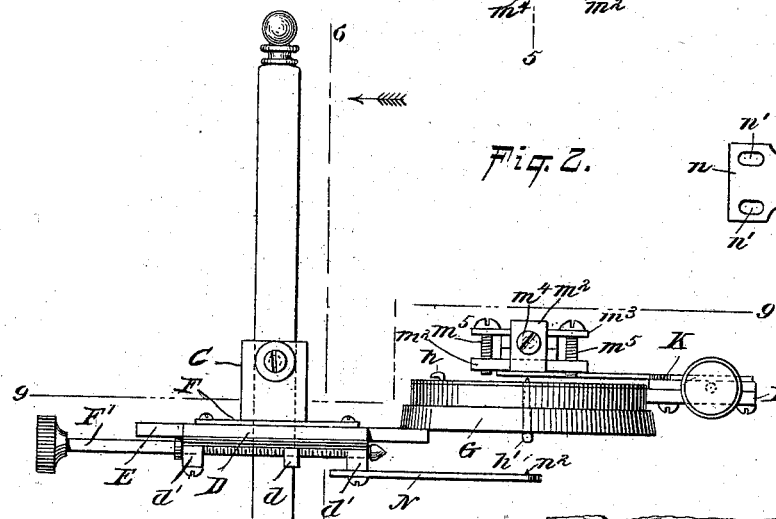
Figure 3:
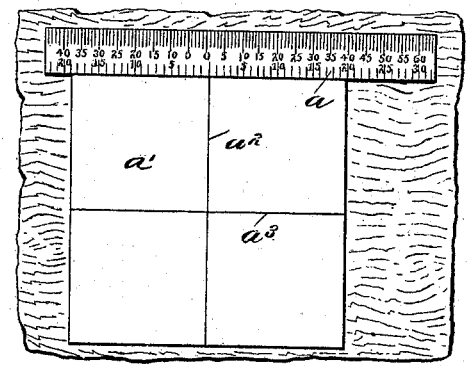

In the accompanying drawings, Figure 1 is a top plan view of my improved instrument, the several parts being in their normal adjustment. Fig. 2 is a side view thereof. Fig. 3 is a plan view of a portion of the base, having the card and scale secured thereon. Fig. 4 is a view of one of the details. Fig. 5 is a sectional view taken on the line 5 5 of Fig. 1. Fig. 6 is a sectional view taken on the line 6 6 of Fig. 2. Fig. 7 is a sectional view taken on the line 7 7 of Fig. 1. Fig. 8 is a sectional view taken on the line 8 8 of Fig. 1. Fig. 9 is a view taken on the line 9 9 of Fig. 2, the cell or lens support being slightly revolved. Fig. 10 is a view taken on the line 10 10 of Fig. 9.

Referring to the drawings, A represents a bed or base, made of wood, metal, or other suitable materials, and to which is secured a card $a'$, having the lines $a^2$ $a^3$ marked or stamped thereon, and which base also has secured thereto the scale $a$, the zero-mark on which registers with the line $a^2$. If desired, this scale and lines $a^2$ $a^3$ may be stamped, marked, or engraved in or upon the base itself. To the base A is also secured, in any desired manner, the lower end of the standard B, preferably made of metal and bearing on one side or face thereof a scale $b$, as shown in Fig. 6, said scale bearing a certain relation to the scale $a$ on the base, which relation is determined by the laws of optics and readily ascertained by those skilled in the art.

Upon the standard B is mounted the vertically-movable slide C, having an opening or openings $c$ formed therein, through which the scale upon said standard may be seen, and bearing an indicating-mark $c^3$, registering with the scale $b$, for indicating the extent of the movement of the slide upon said standard. This standard B is preferably made square in cross-section, and passes through an opening in the slide C of the same shape in order to prevent any lateral movement or revolution of the latter, a binding-screw $c$ passing through the slide and impinging against a plate $c^2$, inserted between said standard and the ends of the binding-screw, said plate in turn pressing tightly against the standard and holding said slide in its vertical adjustments.

To the slide C is secured by means of the bracket-plate $o$ the horizontal guide-plate D, the sides or edges of which are bent upwardly and beveled, as shown in Fig. 6. On this guide-plate slides the plate E, the sides or edges of which are beveled to correspond with the beveled and overlapping edges of said guide-plate D, as shown in Fig. 4, this construction and arrangement preventing the parts from becoming accidentally separated and insuring the proper horizontal movement of said slide E.

To the upper surface of the sliding plate E is secured the plate having a scale F stamped or marked thereon, said scale bearing a proper relation to the scale $a$, which is readily determined by those skilled in the art. If desired, however, the scale F may be stamped or engraved in or on the plate E itself.

The guide-plate D is formed with a longitudinal slot running nearly its entire length, through which passes or extends the lug $d$, as shown in Fig. 6, said lug being formed on or secured to the under side of the sliding plate E. To the under side of the plate D are secured the lugs or brackets $d'$, (shown in Fig. 7,) through which passes the shaft F', having a shoulder formed thereon near both of its ends to bear against said brackets $d'$ and thereby prevent any longitudinal movement thereof. This shaft is threaded in the lug $d'$, thereby causing the plate E, when the shaft is revolved, to travel in a horizontal direction to the right or left on the plate D, in accordance with the direction in which the shaft is turned.

To one end of the sliding plate E is secured the ring or support G, formed on its upper surface with the groove $g$, the sliding plate E and ring G, with their attached parts, forming a support for the ring or cell H, Fig. 5, fitted in the said groove $g$ and revolving concentrically with said ring G, the several parts being prevented from becoming separated by means of the post $h$, having its lower end fastened or secured to the plate E and extending upwardly through said rings, the upper end of the same being bent or turned over above the cell H, as shown in Figs. 1, 7, and 9. The upper plate of the ring H has formed therein the notch $h^2$, which, when the said ring or cell is revolved, may be caused to register with said post $h$, thereby allowing said ring H to be lifted from the lower ring or support when desired.

As shown in the several figures of the drawings, the upper surface of the revolving cell H, or upon the face-plate secured thereto, bears thereon a scale $h^3$, extending half-way round said cell, and bearing a proper relation to said former scale, the purpose or object of which will be hereinafter explained.

The ring or cell H has secured thereto or formed thereon an outwardly-extending arm or bracket I, to which are rigidly secured the horizontal guide-rods $i\ i$, upon the ends of which latter are mounted one end of the movable arms or supports K K, said rods passing into sleeves or bearings $i'\ i'$, formed on or secured to the under side of the said arms K, allowing said arms to be moved toward or away from each other in a horizontal plane. To the bracket I and over said rods $i\ i$ is secured the plate $i^2$, having an opening $i^3$, in which is fitted the ring $i^4$, the latter being securely fastened to a rod L, which has formed thereon a right and left hand screw-thread, engaging with correspondingly-threaded sleeve-bearings $i^5$, formed on or secured to the under sides of the arms K, as shown in Fig. 8. From this description it will be seen that by turning the rod or bar L to the right or left the arms K will be forced to travel toward or away from each other, said arms being guided by and sliding on the stationary guide-rods $i\ i$, the bar or rod L being held against longitudinal movement by the ring or flange $i^4$.

The free ends of the arms K are bent around in the form of an arc of a circle, and have attached thereto at their extreme ends the inwardly-projecting transparent supports M, each of which consists of the two glass plates or shelves $m\ m'$, the latter extending inwardly beyond the edges of the under glass plates $m$, the extreme edges of which latter are hollowed or dished out. These plates $m\ m'$ are secured in clamps or vises, consisting of the angular plates or brackets $m^2$ and the upper plates $m^3$, through which screws $m^5$ pass into the lower plates or brackets $m^2$, and thus bind the said glass plates or shelves in position. Through the vertical side of the plates $m^2$ pass screws $m^4$, the inner ends of which impinge against the upper glass plates $m$, allowing the latter to be adjusted longitudinally toward each other. By making these shelves or lens-supports of glass or transparent material it will be evident that in the use of the instrument the line $a^2$ on the card $a'$ may be seen or viewed from end to end.

Below the ring or cell G is located the removable U-shaped bracket or support N, a projection or plate $n$, formed integral therewith, being screwed to one of the brackets $d'$, the holes $n'$, through which the binding-screws pass, being slightly elongated in order to allow of a horizontal adjustment of the support. The free ends of this bracket have a fine wire or thread $n^2$ secured thereto, which, when said bracket is properly adjusted and the several parts of the instrument in their normal positions, will be in a vertical line or plane with the zero-mark on the scale $a$, secured to the base A, and also in the same vertical line or plane with the line $a^2$ marked on the card $a'$, also secured to the base-plate A, as before described, and also in a vertical plane dividing the rings G H into halves. In some instances this thread or wire is not made use of, and hence I prefer to attach the support N by means of screws or other suitable device, in order that, when desired, it may be removed. It will be evident, of course, that instead of permanently attaching the thread $n^2$ to the support N it might be detachably secured, in order that it alone might be removed when necessary, and thus obviate the necessity of detaching the support N.

Having now fully described the construction of my invention, I will proceed to explain the manner of using the same.

In making use of the instrument to determine the axis of a finished cylindrical lens, the support N and thread $n^2$, or the latter alone, are detached. The lens P, Fig. 5, is then placed upon the projecting ends of the plates $m'$, and the arms K adjusted toward each other until the bearing-points or edges of the plate $m$ impinge against the cylindrical lens, thus geometrically centering the latter, that is, causing the geometrical center of the lens to register or coincide with the geometrical center of the ring or cell H. The latter is then revolved upon its support until that portion of the line $a^2$ on the base A viewed through the lens will register or appear continuous with that portion of said line seen outside the lens. When the parts have been so adjusted, the pointer or post $h'$, secured to the ring or support D and extending upwardly beyond the upper plate or surface of the cell H, will then indicate on the scale $h^3$ the axis of the lens in degrees, or else a direction at right angles to said axis, the axis itself being positively determined by noting the relative distance which the line $a^2$ appears to travel (the parallax) when the cell is given the position above referred to, and when given a revolution of one-quarter of a circle, as one skilled in the art will readily understand.

In determining the angle of deviation of a simple prism, that is, a simple prism as distinguished from a combined lens and prism, the parts are adjusted as shown in Fig. 1, that is, the notch $d^4$ marked, stamped, or engraved upon the edge of the plate D registers with the zero-mark on the scale F, and the pointer $h'$ with the ninety-degree mark on the scale $h^3$. The prism is then placed upon the lower transparent supporting-plates $m'$, as in the case of the lens above described. If desired, the arms K are then adjusted toward each other until the plate $m$ tightly grasps or binds the prism to prevent it from falling from the support or being accidentally shifted, said prism being placed upon the supports $m'$ either based in or out.

By so viewing the wire or thread $n^2$ through the transparent support that it will register with the zero-mark on the scale $a$, the line $a^2$, when viewed through the prism, will be displaced toward the apex of the prism. The extent of displacement will be simultaneously read on the scale $a$. For instance, if when on looking through the prism the thread or wire $n^2$ registers with the zero-mark on the scale $a$, the line $a^2$ registers with "4" on said scale, it will at once be known that it is a prism of four degrees, four prism-diopters, or four centrads, according to the unit of measurement provided on the scale $a$.

In determining the angle of deviation in a sphero-prismatic lens, the instrument is used in the same manner as described in the case of the determination of the angle of deviation in a simple prism. In employing the device, however, for determining the angle of deviation in a cylindro-prismatic or a sphero-cylindro-prismatic lens, it will first be necessary to neutralize the cylinder, or effect of the cylindrical surface, providing the axis be oblique, after which neutralization the instrument is used as before described. In the same manner the instrument may be used to determine the prismatic effect of a lens when said effect is caused by the decentration thereof.

In determining the amount of decentration necessary to obtain a certain or given prismatic effect, the scale F is made use of. After the lens has been adjusted on the holder as in the previous cases, the shaft $F'$ is revolved to the right or left, causing the slide E, having the scale F thereon, to travel in the same direction until the given prismatic effect is observed on the scale $a$. The amount of decentration necessary will then be read on the scale F. For instance, if the effect of a prism of one-half degree be required in the lens of .5 diopters, the slide E will be caused to travel to the right or left until the line $a^2$, when viewed through the upper edge of the lens, keeping, of course, the thread $n^2$ in line with the zero-mark on the scale $a$, will be displaced to the extent of one-half degree on the scale $a$. This movement, or rather the extent of the movement of the slide E and lens, will be indicated on the scale F, thereby giving the amount of decentration on said scale necessary to cause the given effect.

To any one skilled in the art it will be apparent that the details of construction of the device may be changed or varied in many instances without departing from the spirit of my invention. I do not, therefore, limit my invention to such details; but, Having fully described my invention, what I claim as new, and desire to secure by Letters Patent, is—

1. An instrument of the character described, constructed with a revolving cell adapted to hold or support a lens or prism, and having a scale thereon, and a bed or base below said cell and having a scale and line thereon, substantially as and for the purpose described.

2. An instrument of the character described constructed with a vertically-adjustable revolving cell, bearing a scale thereon, and a base having a line and scale thereon, substantially as and for the purpose described.

3. A device of the character described, constructed with a revolving cell, arms secured to said cell, and transparent supports secured to said arms, substantially as described.

4. A device of the character described constructed with a cell, adjustable arms secured to said cell, and transparent supports secured to said arms, substantially as described.

5. A device of the character described, constructed with a revolving cell, arms secured to said cell, and adjustable transparent supports secured to said arms, substantially as described.

6. A device of the character described, constructed with a revolving cell, arms horizontally adjustable and secured to said cell, and horizontally-adjustable transparent supports secured to said arms, substantially as described.

7. A device of the character described, constructed with a revolving cell, having a scale marked thereon, transparent supports adjustably secured to said cell, and a base bearing a line and scale thereon, substantially as described.

8. A device of the character described, constructed with a vertically-adjustable support, a cell having a scale thereon and adapted to hold a lens or prism, and revolving on said support, and a base having an indicating-line and a scale thereon, substantially as described.

9. A device of the character described, constructed with a horizontally and vertically adjustable support, and having a scale thereon, a lens or prism holding cell supported by and revolving on said support, and provided with a scale, and a base having a suitable indicating-line and scale thereon, substantially as described.

10. In a device of the character described, the combination with a base, having an indicating-line and scale thereon, and a vertical standard secured to said base, and also provided with a scale, of a vertically-adjustable support, having a scale thereon, and moving on said standard, a cell having a scale thereon and resting and revolving on said support, and adjustable lens-supports secured to said cell, substantially as described.

11. A device of the character described constructed with a horizontal support, a lens-holding cell, revolving on said support, and having a scale thereon, a base having an indicating-line and scale thereon, and a thread or wire secured below said support and above said base substantially as described.

12. A device of the character described consisting of a base and graduated standard, a horizontally-adjustable support moving vertically on said standard, a revolving cell resting on said support for holding a lens or prism and having a scale thereon, and a pointer or indicator secured to said support, and registering with the scale on said cell, substantially as described.

Signed at New York, in the county of New York and State of New York, this 6th day of April, A. D. 1895.

FREDERIC GILBERT RITCHIE.

Witnesses:
H. W. WIES,
ANTHONY GUSHURST.